Sept. 29, 1964     E. B. McMILLAN     3,151,324
WIDE-BAND ELECTROMAGNETIC-RADIATION ABSORBER
Filed March 18, 1957     2 Sheets-Sheet 1

INVENTOR:
Edward B. McMillan

INVENTOR:
Edward B. McMillan

United States Patent Office 3,151,324
Patented Sept. 29, 1964

3,151,324
WIDE-BAND ELECTROMAGNETIC-RADIATION ABSORBER
Edward B. McMillan, Ipswich, Mass., assignor, by mesne assignments, to The McMillan Corporation of North Carolina, Raleigh, N.C., a corporation of North Carolina
Filed Mar. 18, 1957, Ser. No. 646,585
5 Claims. (Cl. 343—18)

The present invention relates to absorbers, and more particularly to an absorber comprising units effective for both ultra-high-frequency and microwave radiation.

Ideal "free-space" rooms for the testing of electronic equipment call for radiation-absorbing walls from which radiation is not reflected back into the rooms, in order that the equipment may operate without being affected by the presence of other objects. However, some reflection occurs at any interface between media having different dielectric constants as for instance between the air in the rooms and the walls thereof. In general, simple, low-reflection surfaces have not given ideal "free-space rooms."

My prior applications Serial No. 292,089, filed June 6, 1952 (now Patent 2,822,539), entitled "Microwave Radiation Absorbers," and Serial No. 635,992 filed January 24, 1957, entitled "Microwave Radiation Absorbers," of which the present application is a continuation in part, disclose absorber structures or walls which largely prevent the return of microwave radiation through providing sloped subsurfaces of electrical-energy-absorbing material covered with impedance-matching material, that is, material having an electrical refractive index intermediate between that of the medium from which the radiation is incident and the electrical index of refraction of the absorbing surfaces. The impedance-matching material serves the dual purpose of reducing the abruptness of the transition of the wave path from air or other external medium to reduce reflection of unabsorbed energy, and of squeezing into a shorter physical length the microwaves incident upon the absorbing bodies to reduce the required dimensions of the bodies. The impedance-matching cover likewise protects the absorbing bodies from damage and dirt. In the absorber of application Serial No. 635,992, the absorbing bodies are in the form of shells of electrical-energy-absorbent material, and the impedance-matching material serves additionally as a support for the shells.

The slope and size of the subsurfaces are designed with relation to the general wavelength of radiation to be absorbed, to direct any reflected radiation toward other surfaces of the absorbing bodies. The slight reflection from the exposed surface of the layer of impedance-matching material may be substantially cancelled by proper designing of the size of the bodies and thickness of the layer to cause wave interference.

While the absorbers of my prior applications are excellent for microwave radiation, they are not practical for the absorption of longer wavelength radiation as required in testing rooms for television broadcasting equipment because of the size of the absorber bodies and thickness of impedance-matching layer which would be required. The absorption of television-broadcast type radiation also poses the difficulty that a substantial amount of shorter wavelength radiation arises from various sources and must be absorbed to prevent reflected waves and "noise" which would disturb the carrying on of tests.

It is an object of the present invention to provide a new absorber unit and a new absorber including such units effective to absorb energy of a range of frequencies including both ultra-high-frequency and microwave radiation.

I have invented a new radiation absorber comprising an assembly of sloped-surface relatively low-frequency radiation-absorbing units or bodies presenting peaks extending generally in the direction of the source of incoming radiation, each of the bodies being formed of a number of layers of relatively high-frequency radiation-absorbing elements formed of electrical-energy-absorbing material also presenting peaks extending in the direction of the source of incoming radiation. The layers are disposed generally transverse to the direction of incoming radiation, and their edges define the sloped surfaces of the absorbing bodies. The cross section of the absorbing bodies increases in area away from the source of radiation to provide in effect an increasing density of the absorber bodies; and the free space between the surfaces of adjoining bodies decreases in cross-sectional area as the bodies increase in cross-sectional area. The effect of these increases in cross section and effective density is to give a progressively stronger absorption of incoming radiation, and the effect of decreasing free space is to confine the radiation in a progressively narrower space. The elements of the absorber bodies may be in the form of subsurfaces of electrical-energy-absorbing dielectric material covered by an envelope of impedance-matching material. The absorbing elements are disposed to provide effective angles of slope to direct reflected waves away from the source of incoming radiation. An overall layer of low-dielectric-constant impedance-matching material may be provided to cover the assembly of absorber bodies to protect them from dust and to facilitate the entry of incoming radiation into the absorbing bodies.

The invention will be described further in connection with the accompanying drawings forming a part of the disclosure, in which FIG. 1 is a plan view of an assembly of one form of radiation-absorbing bodies constituting a radiation-absorbing wall according to the present invention;

Figure 5:
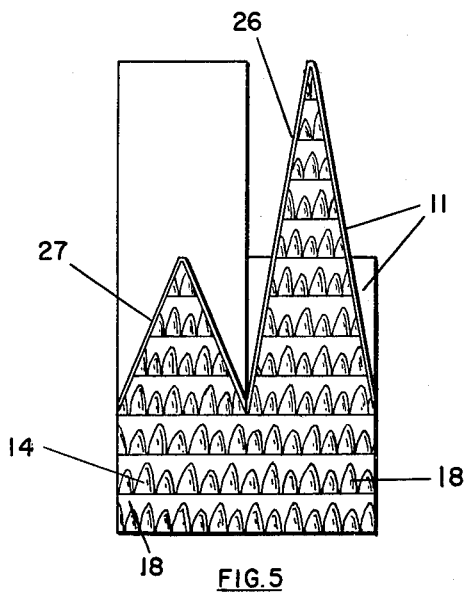
FIG. 5 is an elevation view of the assembly of bodies of FIG. 4.

The radiation absorber of the present invention (see FIGS. 1 and 5) is an assembly of relatively large laminated radiation-absorbing bodies 10 (FIG. 1) and 11 (FIG. 5) composed of layers 12 (FIG. 2) of relatively small absorbing elements 14 and constituting a deep radiation-absorbing layer. The absorbing bodies 10 or 11, and absorbing elements 14 are designed as to shape and relative size and position to absorb a continuous broad band of wavelengths. The absorber bodies 10 or 11 are of size, shape and position relative to each other to take up radiation of the longer wavelength portions of the band; and the absorbing elements 14 are of a size, shape and position relative to each other to take up the shorter wavelength portions of the band which may not be efficiently absorbed by the absorber bodies. Additionally the layers 12 including absorbing elements constitute desirable electrical-energy-absorbing dielectric material for the absorber bodies 10 or 11.

The absorbing bodies 10 or 11 include portions 16 for exposure to radiation and usually include base side portions 18 (see FIGS. 2 and 3) which may be square, triangular or other shape or shapes which will fit together with the base portions of adjacent shapes. The base side portions 18 extend up from the bottoms 20 of the absorbing bodies and fit in face-to-face relation with the base side portions 18 of adjacent bodies to give a substantial depth of absorber-material coverage over substantially all areas of a surface. It is pointed out, however, that with straight-sided wedge-shaped bodies (FIGS. 4 and 5) it has been found unnecessary to provide overall depth by such upward extending base side portions.

The surface portions 16 of the absorbing bodies 10 or 11 slope toward the direction of incoming radiation, and the assembly of absorbing bodies 10 or 11 presents strategically placed peaks 22 and valleys 24. Electrically the assembly progressively increases in effective density and absorbing capacity as a wave front passes the peaks 22 and moves forward into the absorber. Incoming waves reaching the absorption layer are weakened in intensity at a progressively increasing rate. The cross section of the valleys 24 between the surface portions 16 of adjacent absorbing bodies 10 or 11 decrease progressively from the peaks 22 to provide a crowding effect on incoming waves to improve absorption further.

The exposed surface portions 16 of the absorbing bodies may be any of a number of tapered shapes having peaks or ridges 22 extending toward the direction of the source of incoming radiation and presenting sloping surfaces 16 exposed to radiation. The apex angles will ordinarily be less than about 45 degrees. The peak-to-peak span of adjacent uniform-slope-surfaced absorbing bodies 10 is determined by the apex angles and heights of the absorbing bodies 10.

The minimum height of the absorbing bodies 10 is dependent on the longest wavelengths to be absorbed and will ordinarily correspond to at least about one-eight of the longest wavelength.

The absorbing bodies 11 (see FIGS. 4 and 5) are preferably grouped in pairs or other groups in which the bodies 11 are of unequal heights. Groups of bodies of unequal heights tend to eliminate undesired resonance effects. In such groups it is not necessary that all of the bodies be as high as one-eighth of the longest wavelength provided that the effective mean height is at least about one-eighth of the longest wavelength. The effective mean height is the arithmetical average of the heights of all of the bodies.

In the preferred forms of the absorber of the present invention, the relation of the free space between surfaces of the absorbing bodies 10, the depth of the penetration of radiation into the absorber, and the activity of the absorber material of the bodies 10 at any level provides a distribution of resistance to incoming radiation from the front of the absorber (defined by the peaks 22) to the back of the absorber such that the proportioning between the kinetic energy of incoming radiation and the absorbed energy in the absorber never produces an appreciable back reaction to the incoming radiation.

In terms of physical design, the outer surfaces 16 of the absorber bodies 10 in one form of the preferred absorber (see FIGS. 1, 2 and 3) may conform to or approach exponential curves which provide that reaction to incoming radiation increases only at a very gentle rate until the radiation has penetrated well into the absorber. Thereafter the reaction on incoming radiation increases very rapidly so that the energy of the incoming radiation is almost completely absorbed just before the back of the absorber is reached.

The most typical curve providing a desirable relationship is $y = a^x$ in which $a$ has a value of at least about 1.28; but curves approximating this relationship, parabolic curves and the like, or modifications of exponential curves substantially accomplish the desired type of absorption. In the above formula, $x$ is measured from a reference line perpendicular to the base and at the edge of the base. Thus the half-breadth of the absorbing body is the difference between the base half-breadth and the value of $x$ at any given height $y$.

The radiation-absorbing bodies 10 are built up of a number of layers 12 secured in laminated relation as by adhesive, the layers 12 being disposed generally transversely to the direction of incoming radiation and with their edges 40 defining desired outlines for the absorber bodies. In the form shown in FIGS. 2 and 3 these layers are absorber material constructed in accordance with the invention of my above-mentioned application Serial No. 635,992; but it will be understood that other forms of absorber material as shown in my co-pending application Serial No. 292,089 (now Patent 2,822,539) or other comparable absorber material presenting peaks extending in the general direction of the source of incoming radiation and providing in effect sloped surfaces or electrical interfaces and progressively increasing absorption may be used. The layers 12 of my application Serial No. 635,992 comprise sheets 42 of impedance-matching material with a plurality of tapering-shaped recesses 44 formed in one face thereof and with the inner surfaces of the recesses covered with layer 46 of electrical-energy-absorbing dielectric material. Regarding the absorber from that surface of an individual sheet 42 of impedance-matching material not having recesses i.e. the surface in the direction of incoming radiation, the coating or layer 46 of absorbing material constitutes a subsurface of radiation-absorbing elements 14 providing peaks 48 extending in the direction of the source of radiation and interfaces having angles of slope toward the direction of incoming radiation to direct reflected waves away from the source of incoming radiation.

The height of the absorbing elements 14 is selected with respect to the size and shape of the absorbing bodies 10 or 11 to absorb radiation in the range of wavelengths shorter than those which are absorbed satisfactorily by the absorbing bodies and ordinarily will be from about ⅓ to about ¹⁄₂₀ the height of the absorbing bodies 10 or 11.

When the absorbing bodies 10 have surfaces in the form of exponential curves, it has not been found necessary to have base side portions 18 when the slope of the surface 16 of the body 10 is never greater than 45° with respect to the general direction of the incoming radiation. If the slope exceeds 45°, it is preferable to have at least one base side portion 18 and to provide absorbing elements 14 having a height at least substantially equal to 40% of the widthwise distance between a portion of the surface 16 of the absorbing body 10 which is at an angle of 45° to the general direction of the body and a reference plane 28 (FIG. 2) perpendicular to the base and at the edge of the base. The absorbing elements thus cooperate with the absorber bodies 10 to provide continuous absorption capacity over the entire range from the longest wavelength effectively absorbed by the absorbing bodies 10 down to the shortest wavelength effectively absorbed by the absorbing elements 14. The lamination of co-directional layers of electrical-energy-absorptive material separated by spacing layers of impedance-matching material increases the wavelength which may be effectively absorbed by an absorbing body of a given height.

The following examples are given to aid in understanding the invention, and it is to be understood that the invention is not limited to the particular materials, construction or dimensions of the examples.

*Example I.*

A coating composition was prepared by mixing 1000 g. of 50% solids curing-type neoprene (polychloroprene) latex with 40 g. of a 10% aqueous solution of carboxymethyl cellulose (Methocel) and thereafter uniformly dispersing 575 g. of powdered synthetic graphite in the mixture.

The resulting composition was sprayed on the surfaces of the recesses of the cellular polystyrene slabs to form a uniform coating. Approximately two quarts of the coating composition were applied to the recesses of each 1' x 4' slab. The coating was then dried and the latex coagulated to provide a graphite-filled layer supported by and conforming to the walls of the conical recesses in the slabs. The layer had a dielectric loss factor of 0.82 at 10,000 megacycles. The portion of the layer in each recess was a conical body having high ability to absorb and dissipate radiant energy which might impinge on its surface and to constitute a radiation-absorbing component cooperating with the radiation-absorbing components in the other recesses of the slab. The tapered recesses 44 could be formed in one face of sheets of dielectric impedance-matching material 42 by any method such as drilling, cutting, molding or casting. Cellular polystyrene sheets or slabs are commercially available, relatively inexpensive, and are readily shaped by rotating cutters. For example, tapered conical recesses 44 may be formed rapidly and to proper shape and relative position by a gang drill fitted with appropriately designed cutter blades. Tapered conical recesses drilled in one face of a sheet of dielectric impedance-matching material 42 can be arranged on equidistant centers so spaced that the recesses overlap slightly along the rows thereof, and only small areas of the original surface of the face of the sheet are left. The depth of the recesses 44 is designed to be not substantially less than one-third wavelength in the impedance-matching material, for the longest waves to be absorbed. The half angle of the apex of the depressions should not substantially exceed the angle which is the complement of the angle of incidence of the incoming radiation, the latter angle being measured from the normal to the surface of the sheet or slab of impedance-matching material. While the recesses are shown as uniform in size and arranged in a regular pattern, it is possible to provide recesses of random diameter and/or random distribution in the directions transverse to the direction of incoming radiation.

The cellular polystyrene material was in contact with and covered these radiation-absorbing components or bodies on their sides in the direction toward the incoming radiation and provided impedance matching to reduce reflection from the bodies. That is, the dielectric constant of the cellular polystyrene material was substantially less than that of the graphite-filled material and therefore incoming radiation could enter into it more easily than into the graphite-filled material, and since the cellular polystyrene had a higher dielectric constant than air, radiation from the cellular polystyrene could enter the graphite-filled material more readily than from air. This impedance matching eliminated the abruptness of the transition of incoming radiation from air into the absorbing bodies and reduced the reflectivity of the absorbing bodies. Also since the cellular polystyrene had an electrical index of refraction higher than that of air, incoming waves were squeezed to a smaller size allowing the absorbing bodies to be smaller than if they were reeciving radiation from air.

The sheets of formed and coated cellular polystyrene were tested for absorbing capacity at 10,000 megacycles and had a power-reflection coefficient of about 0.1%.

The pieces were then cut to a width of 5⅞ inches and lengths such that when assembled in laminated relation the end edge projected somewhat beyond the desired outline of the absorbing body. In this case the outline of each side of the absorbing body was the exponential curve $y = a^x$ in which $a = 1.368$. The right-hand side of the absorbing body was, of course, the mirror image of the left-hand side.

Figure 3:
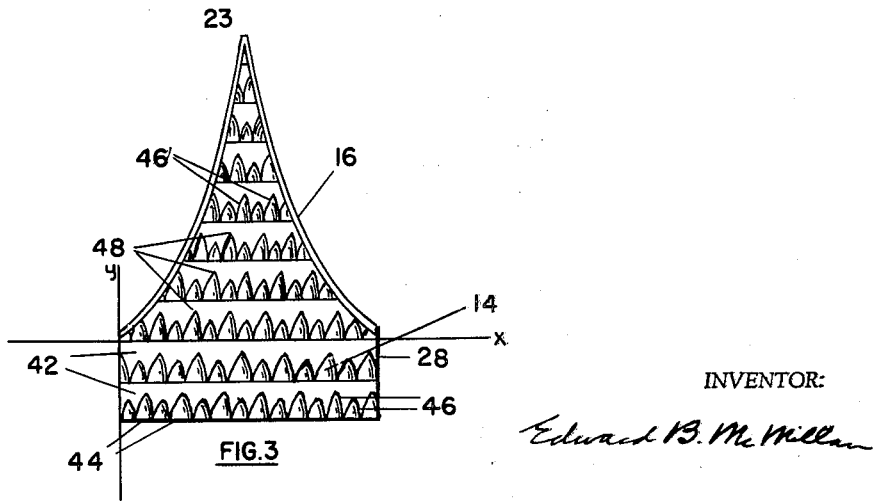
FIG. 3 is a somewhat enlarged side view of one of the radiation absorbing bodies of the assembly of FIG. 1.
Figure 4:
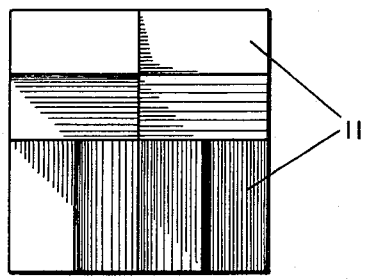
FIG. 4 is a plan view of an assembly of a second form of radiation absorbing bodies according to the present invention.

Referring to FIG. 3 and using the value $a = 1.368$ in the formula $y = a^x$, the following table of coordinates was obtained.

| y | x |
|---|---|
| 1 | 0 |
| 2 | 2.21 |
| 3 | 3.51 |
| 4 | 4.43 |
| 6 | 5.72 |
| 10 | 7.35 |
| 20 | 9.57 |
| 36 | 11.4 |
| 44 | 12 |

Thirteen pieces were required in order to establish the curve and to provide a six-inch-thickness base. Each of the faces of the pieces which was to be joined to the face of another piece was roller coated with a 50%-solids polychloroprene latex thickened with 4% of a 10%-solids aqueous solution of carboxymethylcellulose. The pieces were assembled while the latex was still wet and with the smooth faces of the layers in the direction of the peaks of the absorbing body. After standing overnight, the pieces adhered strongly together with the end edges outlining a rough exponential-curve-surfaced body. The side of the body was marked with the true exponential-curve coordinates, and the body was cut to these markings using a bandsaw.

The curved surfaces of the body and one face of two ¼-inch-thick sheets of 1.7 to 23 pounds-per-cubic-foot cellular polystyrene were coated with an aqueous resin emulsion adhesive. The adhesive coating was dried for two hours to a pressure-sensitive condition. The sheets of polystyrene were then pressed against the curved surfaces of the body and firmly held there by the adhesive to provide a smooth, dust-free covering of impedance-matching material.

Figure 1:
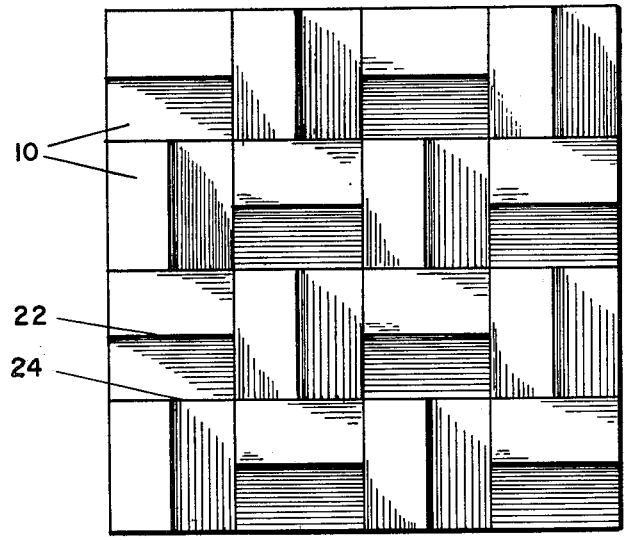
Figure 2:
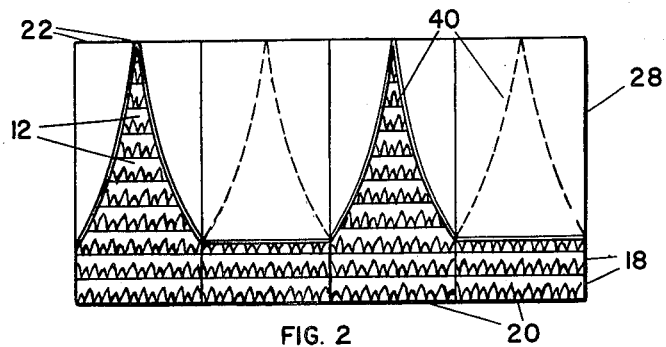
FIG. 2 is an elevation view of the assembly of bodies of FIG. 1.

The bases of the absorbing bodies thus made were secured to plywood boards by the thickened polychloroprene latex in the configuration shown in FIG. 1. The plywood boards with absorbing bodies thereon were secured to the walls, ceiling and floor of a room to form a substantially reflectionless "free-space" room.

In another configuration of my invention, groups of three of the absorbing bodies were disposed in side to side relation to form wedges, and these wedges were secured to the boards in base-to-base relation with the peak of each wedge extending 90° to the peaks of adjacent wedges. The plywood boards with wedges of absorbing bodies thereon were secured to the walls and ceiling of a room. When tested at frequencies of 50, 100 and 200 megacycles, there were observed reflections of only 1.1%, 1.21% and 1.2% in power respectively.

*Example II*

Strips of formed and coated cellular polystyrene were prepared as described in Example I and assembled into laminated absorbing bodies 11 (FIGS. 4 and 5) in which the projecting portion was triangular in cross-section. According to this example, two sizes of projecting portions 26 and 27 were prepared, one size 26 having a height of 36 inches and a base 18 of 12 inches and the second size 27 having a height of 16 inches, a base 18 of 12 inches and an apex angle 27 of 44°. Three thicknesses of the formed and coated cellular polystyrene sheets were secured to the bases of the projecting portions, and the bases of the absorbing bodies were secured to plywood boards with bodies of the first size alternating with bodies of the second size, and these boards were secured to the walls and ceilings of a room. When tested at frequencies of 50, 100 and 200 megacycles, the surface covered with these bodies showed reflections of 3%, 3% and 2% respectively.

*Example III*

Exponential-curve-surfaced absorbing bodies were formed by the procedure set forth in Example I and with a value for $a = 1.28$. The projecting curved portions had a height of 28 inches, a base of 24 inches, and a maximum apex angle of about 15°. Three thicknesses of the formed and coated cellular polystyrene sheet were secured to the bases of the projecting portions to provide an overall height of 40 inches. When tested at frequencies of 50, 100 and 200 megacycles, the surface covered with these bodies showed reflections of 2%, 4%, and 2% respectively.

*Example IV*

Triangular-cross-section absorbing bodies 36 inches in height with 24-inch bases and apex angles of 39° were prepared by the procedure of Example I. When tested at frequencies of 50, 100, and 200 megacycles, a surface covered with these bodies showed reflections of approximately 4% at each frequency.

*Example V*

Cellular polystyrene slabs two inches in thickness having a density of 1.7 to 2.3 pounds per cubic foot and a dielectric constant of 1.04 were formed with conical recesses $1\frac{13}{16}$ inch deep with apex angles of 40° on $1\frac{1}{2}$ inch centers. The surfaces of the recesses were given two coatings of the neoprene-and-graphite composition described in Example I, with drying after each coat.

Strips of this formed and coated cellular polystyrene were laminated and shaped to provide triangular-cross-section absorbing bodies 28 inches in height with 12-inch bases and apex angles of 25°. When tested at frequencies of 50, 100 and 200 megacycles, a surface covered with these bodies showed reflections of 3%, 9% and 4% respectively.

I claim:

1. A wide-band electromagnetic radiation absorber including an assembly of sloped-surfaced relatively long-wavelength radiation-absorbing bodies presenting peaks for extension generally in the direction of the source of incoming radiation, each of said bodies comprising layers of shorter-wavelength-radiation-absorbing elements, at least a surface of said elements being formed of dentate contoured electrical-energy-absorbing dielectric material, said layers being for disposition generally transversely to the direction of incoming radiation and the edges of said layers determining the slope of the surfaces of said absorbing bodies to direct reflected radiation away from the source of said radiation.

2. A wide-band electromagnetic radiation absorber including an assembly of sloped-surfaced relatively long-wavelength-radiation-absorbing bodies presenting peaks for extension generally in the direction of the source of incoming radiation, each of said bodies comprising layers of shorter-wavelength-radiation-absorbing elements, at least a surface of said elements being formed of electrical-energy-absorbing dielectric material, said absorbing elements presenting peaks for extension generally in the direction of the source of incoming radiation, said layers being for disposition generally transversely to the direction of incoming radiation and the edges of said layers determining the slope of the surfaces of said absorbing bodies, said absorbing elements serving to absorb shorter-wavelength radiation not efficiently absorbed by said longer-wavelength-radiation-absorbing bodies.

3. A wide-band electromagnetic radiation absorber as defined in claim 2 in which said layers comprise sheets of relatively low-dielectric-constant material and subsurfaces comprising a plurality of radiation-absorbing elements covered on their incident side by said low-dielectric-constant material, at least a surface of said absorbing elements being composed of electrical-energy-absorbing dielectric material, the interfaces between said elements and said low-dielectric-constant material having dentate contours for orientation toward the direction of incoming radiation to direct reflected waves away from said source of said incoming radiation, and said sheets of low-dielectric-constant material constituting an outer surface of impedance-matching material for said elements presenting a surface into which radiation enters more easily than into said elements.

4. A wide-band electromagnetic radiation absorber as defined in claim 3 in which the peaks of the absorbing elements have a height from about $\frac{1}{3}$ to about $\frac{1}{20}$ the height of said absorbing bodies.

5. A wide-band electromagnetic radiation absorber including an assembly of sloped-surfaced relatively long-wavelength-radiation-absorbing bodies presenting peaks for extension generally in the direction of the source of incoming radiation, each of said bodies comprising layers of shorter-wavelength-radiation-absorbing elements formed of electrical-energy-absorbing dielectric material, said layers being for disposition generally transversely to the direction of incoming radiation, said elements terminating in peaks and being for extension generally in the direction of the source of incoming radiation and the edges of said layers of each body determining the surfaces of said body as curves approaching exponential curves, said absorbing bodies having a height at least $\frac{1}{8}$ of the longest wavelength to be absorbed, and the peaks of said absorbing elements having a height of from $\frac{1}{3}$ to $\frac{1}{20}$ the height of said absorbing bodies.

References Cited in the file of this patent

UNITED STATES PATENTS

| | | |
|---|---|---|
| 2,356,640 | Wolff | Aug. 22, 1944 |
| 2,464,006 | Tiley | Mar. 8, 1949 |
| 2,870,439 | Stinehelfer | Jan. 20, 1959 |

FOREIGN PATENTS

| | | |
|---|---|---|
| 608,949 | Great Britain | Sept. 23, 1948 |
| 766,814 | Great Britain | Nov. 11, 1954 |
| 507,981 | Canada | Dec. 7, 1954 |

OTHER REFERENCES

De Motte: Abstract of application Serial Number 769,710, published Dec. 23, 1952, O.G.

A text book of Sound, by A. B. Wood, published by McMillan, Co., New York (1955), pp. 544–545 relied on.

C.I.O.S. Item No. I, File No. XXVI–24, "The Schornsteinfeger Project," by the Combined Intelligence Objectives Sub-Committee, May 1945, declassified Feb. 19, 1960; pp. 26 and 27 relied on.